United States Patent [19]
Sailer

[11] 3,753,066

[45] Aug. 14, 1973

[54] DIGITAL TWO-SPEED MOTOR CONTROL

[75] Inventor: Henry Sailer, Ventura, Calif.

[73] Assignee: The United States of America as represented by the Secretary of the Navy, Washington, D.C.

[22] Filed: May 8, 1972

[21] Appl. No.: 251,063

[52] U.S. Cl.................................. 318/305, 318/345
[51] Int. Cl. .............................................. H02p 5/16
[58] Field of Search.................... 318/276, 305, 345, 318/391, 416, 417, 421, 326–328, 318

[56] References Cited
UNITED STATES PATENTS
3,546,530  12/1970  Simonsen............................ 318/326

Primary Examiner—Bernard A. Gilheany
Assistant Examiner—Thomas Langer
Attorney—Richard S. Sciascia, J. M. Amand and David O'Reilly

[57] ABSTRACT

A remote digital two-speed motor control, for controlling frequency or bandwidth tuning of a jamming transmitter. A digitally controlled transistor switches the speed of a motor after a predetermined time delay. The motor may be retained in the initial speed by continuous resetting of the digital circuit before the timing circuit reaches a firing voltage.

10 Claims, 2 Drawing Figures 3,753,066

DIGITAL TWO-SPEED MOTOR CONTROL

BACKGROUND OF THE INVENTION

The present invention relates generally to digital switching circuits and more particularly relates to digital control of a motor.

In many applications, particularly in aircraft, the number of switching and control functions are so great that wire bundle size is very critical. Therefore, any improvements which reduce the number of control wires provide a distinct advantage. Presently, ECM (electronic countermeasure) systems that have jamming frequency and/or jamming bandwidth tuning require a minimum of one potentiometer and three control wires. The potentiometer is located in the aircraft cockpit and the three wires extend from the cockpit to external stores. The potentiometer controls a motor which in turn tunes the frequency and/or bandwidth of a jamming transmitter through a series of clutches. The present invention performs the same functions but utilizes only one control wire.

SUMMARY OF THE INVENTION

The purpose of the present invention is to provide a two-speed motor control with a minimum of control wires. This is accomplished by digital control of a transistor which switches the speed of a motor after a predetermined time. A timing circuit automatically changes the speed of a motor by changing the state of a set-reset flip-flop after a predetermined time delay. The motor can be retained in the initial speed by continuous resetting of the flip-flop before the timing circuit builds up to a firing voltage. The motor controls the frequency and bandwidth tuning of a jamming transmitter.

One object of the present invention is to provide a two-speed motor control having a minimum of control wires.

Another object of the invention is to provide a remote digital two-speed motor control for controlling the ECM functions of jammer frequency tuning and jammer bandwidth tuning.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
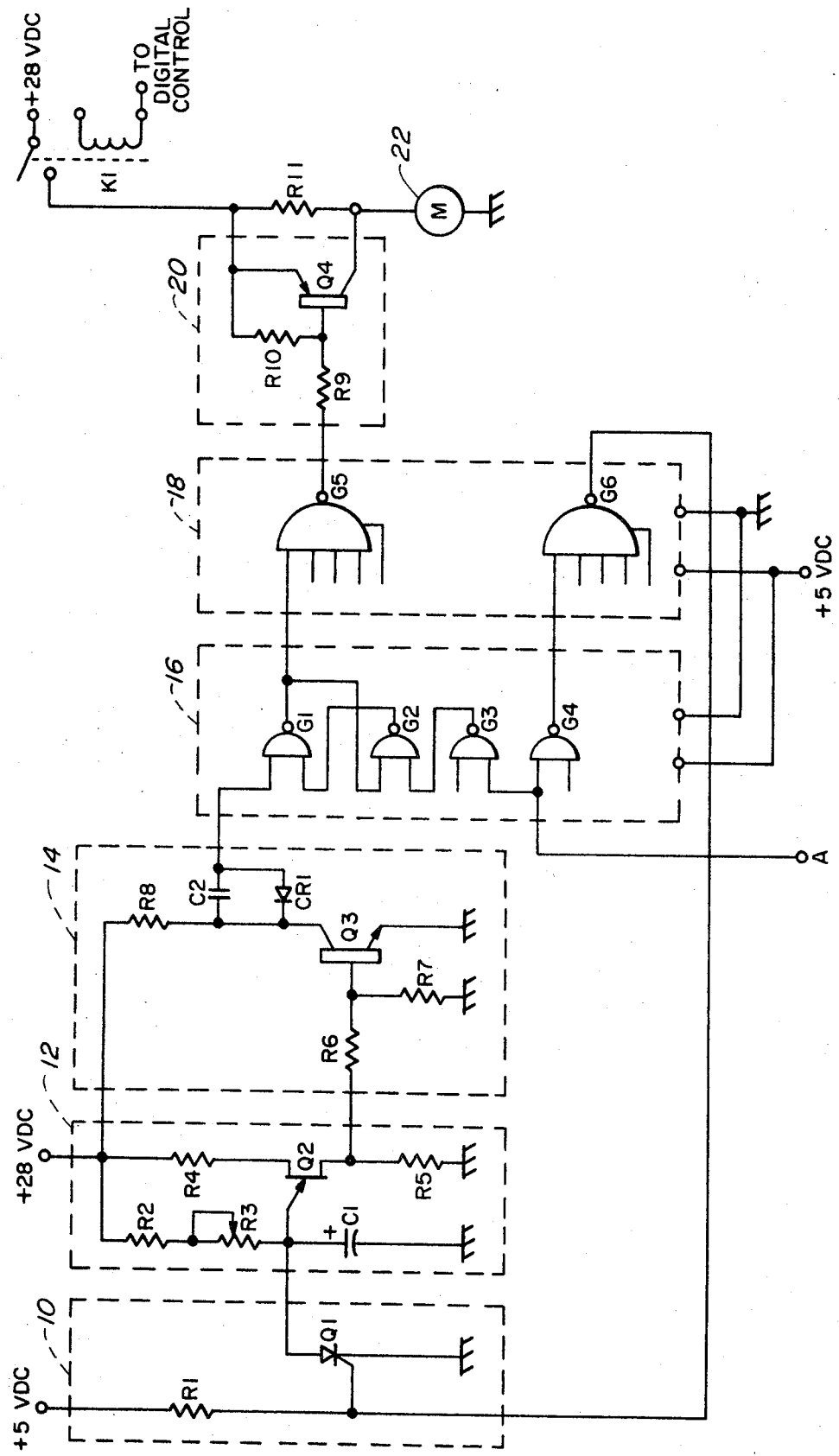
FIG. 1 is a schematic diagram of the digital two-speed motor control.

FIG. 1 shows in schematic form the novel digital two-speed motor control circuit. The circuit is comprised of inhibit control 10, pulse timing control 12, inverting pulse amplifier 14, reset-set flip-flop 16, power amplifier gate 18, output control 20, and d.c. motor 22. Inhibit control 10 is provided by silicon controlled rectifier Q1 while pulse timing control 12 is comprised of a unijunction transistor Q2 receiving an input from a time constant circuit. Reset-set flip-flop action is provided by an integrated circuit having quadruple two-input NAND gates. Power amplifier 18 is also an integrated circuit having dual NAND power gates. Both integrated circuits have a steady state input of +5 volts. They are operated by applying a low input of 0 volts (ground) to the gates.

In the preferred embodiment, the d.c. motor 22 provides fine and coarse tuning of frequency and bandwidth in a jamming transmitter through a series of clutches. It will be readily apparent, however, that the novel circuit has other applications.

Power is initially applied to d.c. motor 22 through resistor R11 which is selected to provide the desired slow speed for fine tuning of a jamming transmitter or other device. Output control transistor Q4 shunts slow speed control resistor R11 and switches the motor to fast speed for coarse tuning when it is turned on. This occurs automatically after a predetermined time set in the pulse timing control 12.

Fast speed is automatically controlled by pulse timing control 12, inverting pulse amplifier 14, reset-set flip-flop 16 and power amplifier 18 which operate to turn output control transistor Q4 on. In the pulse timing control 12, unijunction transistor Q2 produces a pulse when capacitor C1 reaches firing voltage according to the time constant of R2, R3 and C1. In the preferred embodiment the time constant can be varied between approximately 0.25 and 1 sec by adjusting R3.

The pulse output from pulse timing control 12 is amplified and inverted by transistor Q3 of the inverting pulse amplifier. The pulse is applied to the reset-set flip-flop and produces a high output to gate G1 of power amplifier 16. Output control transistor Q4 is then turned on bypassing resistor R11, changing d.c. motor to fast speed.

At this time, Q1 of inhibit control 10 is off which permits C1 to build-up to firing voltage according to the time constant of R2, R3 and C1. A high (i.e., an open circuit) digital input applied at A resets flip-flop 16 and produces a high output from gate G6 of power amplifier 18. This output turns transistor Q1 on, inhibiting C1 from reaching firing voltage.

The high (open circuit) digital input at A is also applied to relay coil K1 through another digital circuit (now shown) and opens the contacts of the relay. When point A is again switched to a low digital input (OV), a low is applied through a digital circuit (not shown) to relay coil K1, closing its contacts and d.c. motor 22 begins operating at slow speed. The low at point A produces a low on the gate of Q1 turning it off and capacitor C1 begins to charge up to a firing voltage according to the time constant of R2, R3 and C1.

Because of the cross-coupling of the outputs of gates G1 and G2 of flip-flop 16, it will act as a RS (reset-set) memory. That is, only a transition from a high to a low on the inputs of gates G1 or G2 will change the output. A low input at point A will turn Q1 of inhibit control 10 off, permitting capacitor C1 to charge to firing voltage. When C1 fires it will supply a low to the input of gate G1 of flip-flop 16, changing the motor 22 to high speed. It will remain in high speed until there is a transition from a high to a low (i.e., a high input at point A) on the input of gate G2. Capacitor C1 is permitted to continue firing just in case a transient should change the input on gate G2 to a low.

To retain d.c. motor 22 in slow speed, the operator must jog point A (i.e., switch from a low to a high and back to a low) before time constant circuit R2, R3 and C1 reaches a firing voltage. If a high (open circuit) digital input is left on point A, the contacts of relay K1 will open and d.c. motor 22 will stop. The motor 22 will not start again until a low (ground) is applied at point A.

As an alternative, the time constant of timing control circuit can be a fixed value. Once an optimum setting for R3 is determined, resistors R2 and R3 can be replaced with a fixed resistor.

With the present design, the circuit provides stop, slow speed control and automatic fast speed after a predetermined time delay. If desired, a slight modification of the circuit will provide the reverse functions. That is, stop, fast speed control and automatic slow speed after a predetermined time delay. This can be done by substituting an NPN transistor for the PNP transistor Q4 in output control 20.

With a low (ground) digital input applied at point A, the contacts of relay K1 are closed and power is now applied to d.c. motor 22 through NPN transistor Q4. Thus, the motor 22 is operating at high speed. The low input at point A produces a low on Q1 which turns it off and C1 starts charging to firing voltage. C1 fires according to the time constant of R2, R3 as before except that Q4, which is now an NPN transistor is turned off. This switches the motor to slow speed because power is now being supplied to the motor through resistor R11.

Figure 2:
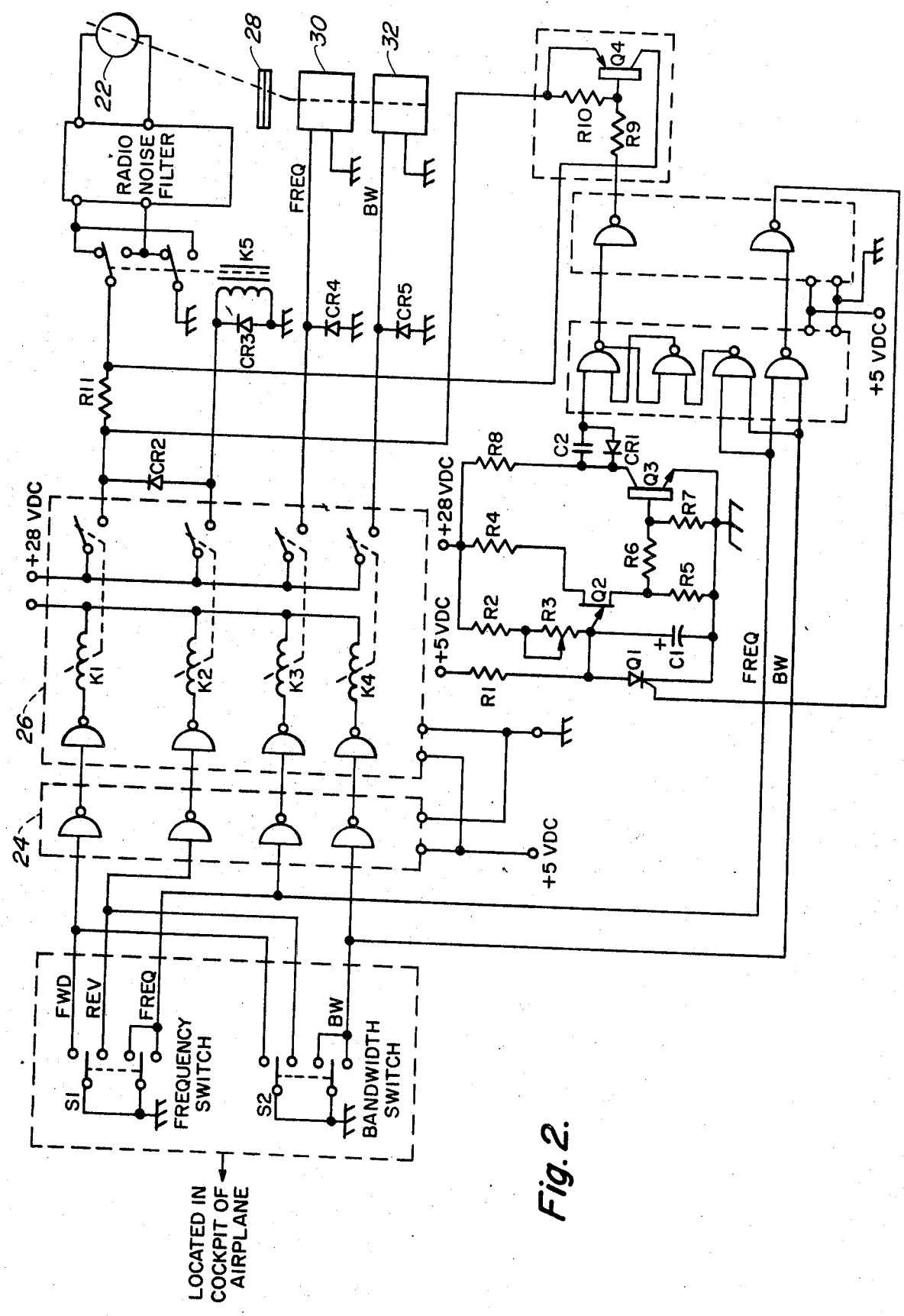
FIG. 2 is a schematic of the digital two-speed motor adapted to tune the frequency and bandwidth of a jamming transmitter.

FIG. 2 is a schematic diagram of a particular circuit utilizing the novel circuit to control both frequency and bandwidth tuning of a jamming transmitter. The operator must be able to tune across the frequency spectrum in either direction. Thus, this circuit incorporates separate inputs for frequency and bandwidth and a relay which reverses the motor 22.

Switches S1 and S2 provide selection of frequency or bandwidth in either the forward or reverse direction. The switches shown are two-section toggle switches but other switches or circuit configurations may be used. The important thing is that only a single wire is needed for bandwidth or frequency control rather than three for each with the present potentiometer method of control.

Frequency or bandwidth and forward or reverse motor control is provided through a plurality of NAND gates 24 and power gates 26 which operate relays K1 to K4. Relay K1 operates motor in the forward direction while relay K2 in conjunction with relay K5 controls reverse operation. Motor 22 is connected to slip clutch 28 and operates frequency magnetic clutch 30 or bandwidth magnetic clutch 32. Each magnetic clutch is mechanically connected to a potentiometer (not shown) for frequency or bandwidth adjustment. Additional control functions can be added by using an alternate integrated circuit with a gate expander for flip-flop 16.

The following exemplary values for the components of FIG. 1 have been found to be satisfactory in practice:

C1 = 6.8μf 35 V
C2 = .02μf 100 V
R1 = 470 Ω
R2 = 39K Ω
R3 = 100K Ω
R4 = 270 Ω
R5 = 47 Ω
R6 = 33 Ω
R7 = 1K Ω
R8 = 1.2K Ω
R9 = 1K Ω
R10 = 100 Ω
Q1 = silicon controlled rectifier
Q2 = unijunction transistor
Q3 = transistor
Q4 = PNP or NPN transistor As indicated earlier, the value selected for R3 gives a time constant between 0.25 and 1 second but could be fixed at some optimum value for a particular application. Integrated circuits for the flip-flop and power amplifier were provided by Texas Instrument part no. TI 15846N and Motorola Corp. part no. MC844P, respectively. The value for R11 is selected to provide any desired slow speed of the motor.

Thus, there has been disclosed a digital two-speed motor control having a minimum of control wires and particularly suitable for aircraft use in tuning frequency or bandwidth of a jamming transmitter.

Obviously, many modifications and variations of the present invention are possible in the light of the above teachings. It is therefore to be understood that within the scope of the appended claims the invention may be practiced otherwise than as specifically described.

What is claimed is:

1. A digital two-speed motor control comprising:
a motor;
a power source connected to said motor; resistive means connected between said power source and said motor for operating the motor at a predetermined slow speed;
a transistor control connected in parallel with said resistive means for changing the motor to fast speed;
means for switching said transistor control on; said switching means comprising a flip-flop adapted to switch said transistor control on when it produces a high output; a power gate for amplifying the output of the flip-flop and applying it to the transistor control;
means for changing the output of the flip-flop to a low state and back to a high state after a predetermined time; said means comprising a switch for changing the input of the flip-flop to a high state; timing means for producing a pulse after a predetermined time constant expires; pulse inverting means connected to said timing means for applying said pulse to said flip-flop; and inhibiting means for preventing the timing means from reaching firing voltage; said inhibiting means connected to the flip-flop through the power gate and adapted to be energized by said flip-flop when it receives a high input.

2. The control system of claim 1 wherein said transistor is a PNP transistor whereby said motor is initially in slow speed and switches to high speed after a predetermined time.

3. The control system of claim 1 wherein said transistor is an NPN transistor whereby said motor is initially in fast speed and switches to slow speed after a predetermined time.

4. The control system of claim 1 wherein said timing means has an adjustable resistive-capacitive time constant.

5. The control system of claim 4 wherein said inhibiting means is a silicon controlled rectifier with its gate connected to the flip-flop through the power gate.

6. The control system of claim 5 including means for tuning a jamming transmitter.

7. The control system of claim 6 wherein said tuning means comprises a series of clutches connected to said motor.

8. The control system of claim 7 including means for selecting frequency or bandwidth tuning.

9. The control system of claim 8 including means for operating said motor in forward or reverse direction.

10. The control system of claim 9 wherein said means for selecting frequency or bandwidth tuning and operating said motor in the forward or reverse direction comprises a plurality of NAND gates; power gates and relays connected to the input of said flip-flop.

* * * * *